United States Patent
Lehmair et al.

(10) Patent No.: US 7,874,254 B2
(45) Date of Patent: Jan. 25, 2011

(54) DEVICE FOR THE SECONDARY SUSPENSION OF A CAR BODY IN A RAIL VEHICLE

(75) Inventors: Martin Lehmair, Munich (DE); Eduard Nies, Puchheim (DE); Winfried Hommen, Ebersberg (DE); Martin Waldstein, Munich (DE); Ralf Oberthur, Munich (DE)

(73) Assignee: Knorr-Bremse Systeme für Schienenfahrzeuge GmbH, Munich (DE)

( * ) Notice: Subject to any disclaimer, the term of this patent is extended or adjusted under 35 U.S.C. 154(b) by 234 days.

(21) Appl. No.: 11/911,996

(22) PCT Filed: Apr. 21, 2006

(86) PCT No.: PCT/EP2006/003673

§ 371 (c)(1),
(2), (4) Date: Jan. 24, 2008

(87) PCT Pub. No.: WO2006/111398

PCT Pub. Date: Oct. 26, 2006

(65) Prior Publication Data

US 2008/0210119 A1 Sep. 4, 2008

(30) Foreign Application Priority Data

Apr. 22, 2005 (DE) .................. 10 2005 018 945

(51) Int. Cl.
*B61F 5/10* (2006.01)

(52) U.S. Cl. .................. 105/199.3; 105/198.3; 105/453

(58) Field of Classification Search ............. 105/198.1, 105/198.3, 199.3, 199.1, 453

See application file for complete search history.

(56) References Cited

U.S. PATENT DOCUMENTS

| 5,573,266 | A | 11/1996 | Zalewski et al. | |
|---|---|---|---|---|
| 5,588,368 | A | 12/1996 | Richter et al. | |
| 6,550,394 | B1 * | 4/2003 | Polley | 105/164 |
| 6,637,348 | B1 * | 10/2003 | Teichmann et al. | 105/453 |
| 7,185,592 | B2 * | 3/2007 | Hommen et al. | 105/453 |
| 7,243,606 | B2 * | 7/2007 | Hommen et al. | 105/453 |
| 2004/0016361 | A1 | 1/2004 | Teichmann et al. | |
| 2008/0210119 | A1 | 9/2008 | Lehmair et al. | |

FOREIGN PATENT DOCUMENTS

| DE | 103 15 000 | 11/2003 |
|---|---|---|
| WO | 2006/111398 | 10/2006 |

OTHER PUBLICATIONS

Notification Of Transmittal Of Copies of Translation Of The International Preliminary Report On Patentability for PCT/EP2006/003673 Apr. 21, 2006.

* cited by examiner

*Primary Examiner*—S. Joseph Morano
*Assistant Examiner*—Zachary Kuhfuss
(74) *Attorney, Agent, or Firm*—Barnes & Thornburg LLP

(57) ABSTRACT

A device for the secondary suspension of a body of a rail vehicle, the device comprising a spring element which is between the body and a bogie and to ensure at least one raised transport level for the body during the journey of the rail vehicle. The spring element can be compressed by a traction cylinder when the rail vehicle is stationary, in order to adjust a sunken platform level for the body, which is arranged below the raised driving level. The traction cylinder is provided with means for mechanically decoupling the advancing movement of the body from a pressure reduction in the pressure chamber of the traction cylinder.

1 Claim, 3 Drawing Sheets

DEVICE FOR THE SECONDARY SUSPENSION OF A CAR BODY IN A RAIL VEHICLE

BACKGROUND AND SUMMARY

The present disclosure relates to a device for the secondary suspension of a car body in a rail vehicle, having a steel spring as a passive spring element which is arranged between the car body and a bogie and which ensures at least a raised travel level for the car body while the rail vehicle is traveling, wherein the steel spring can be compressed by means of a traction cylinder when the rail vehicle is stationary, in order to set a lowered railway platform level, below the raised travel level, for the car body.

A secondary suspension between a car body a track-bound bogie of a rail vehicle is used in particular to provide additional isolation of the car body from vibrations in order to permit a comfortable journey in passenger transportation. In many cases, the secondary suspension also interacts with a rolling controller for the car body. In addition to the secondary suspension for increasing comfort, a rail vehicle of the type which is of interest here also has a primary suspension. The primary suspension acts between the wheel axles of the rail vehicle and the bogie and serves predominantly to absorb hard shocks to which the rail vehicle is subjected while traveling owing to uneven positioning of the rails and the like.

DE 103 15 000 A1 discloses a device of the generic type for providing secondary suspension. In order to provide secondary suspension, a spring element, which can be an active hydraulic spring, pneumatic spring or the like or else a passive spring in the form of a steel spring or the like which is embodied in the manner of a compression spring, is provided between the bogie and the car body. A traction cylinder, with which a restoring force which acts counter to the force of the spring element can be generated, is provided as the spring element between the bogie and the car body, in order to be able to move the car body from the raised travel level into a lowered railway platform level (loading and/or unloading position) and hold it there. Deactivating the traction cylinder causes the car body to be moved back into the raised travel level by the restoring force of the spring stage. The traction cylinder here is a hydraulic cylinder which can be acted on at one end. So that the traction effect occurs, that is to say so that the piston rod dips into the cylinder body of the traction cylinder when pressure medium is applied, the internal piston is subjected to an application of pressure medium at the cylinder cover end.

A disadvantage of the known device which is described above results from the fact that when movements are impressed on the traction clynder as a result of the dynamics of the vehicle in the pressureless state of the traction cylinder, the air which is released in the hydraulic oil (owing to the partial vacuum caused in the pressure chamber of the traction cylinder due to the downward movement of the car body) can cause damage to seals, such as the diesel effect or cavitation effect. Trials have shown that the partial vacuum which is produced in the pressure chamber of the traction cylinder due to the external forces draws air from the outside via dynamic hydraulic seals which act at one end of the traction cylinder. In the course of time, this has a disadvantageous effect on the entire system behavior, in particular the reaction times, The object of the present device therefore to improve further a device for providing secondary suspension of the type described above in such a way that the wear of the hydraulic system which acts on the traction cylinder is minimized so that in particular the reaction times remain small.

The object is achieved in that the traction cylinder is equipped with means for mechanically decoupling the downward movement of the car body from a reduction in pressure in the pressure chamber of the traction cylinder.

The advantage of the solution is that a partial vacuum in the traction cylinder owing to a downward movement of the car body is avoided. The mechanical decoupling breaks the fixed connection between the piston and piston rod. This ensures that the downward movement which is forced on the piston rod by the car body does not lead to a displacement of the piston. As a result, a partial vacuum is not generated in the pressure chamber of the traction cylinder so that the partial vacuum problems which are described at the beginning no longer occur. In an upward movement which is forced on the piston rod, the piston is, however, dragged upward by the piston rod. In such a case, only excess pressure occurs due to flow resistances, and this does not entail appreciable disadvantages. The solution also decouples the seals of the hydraulic system from high-frequency dynamic movements, which leads to a lower degree of wear on the seals. This results in a significant lengthening of the service life of the traction cylinder itself and of the seals of the hydraulic system which is connected directly thereto. This in turn results in lengthening of the intervals between two overhauls of traction cylinders by the operator of the rail vehicle.

The means for mechanical decoupling can preferably be constructed according to the embodiments described below.

On the one hand it is possible to provide the piston of the traction cylinder with a central passthrough for a collared piston rod so that the piston remains in the current position during the downward movement of the collared piston rod. As a result of this disconnection of the piston rod embodied as a collared piston rod, and of the piston, downward movements, that is to say a reduction in the distance between the car body and bogie, only cause the piston rod to move downward into the traction cylinder. The piston itself is not moved downward so that no partial vacuum is generated either. Upward movements of the collared piston rod cause it to entrain the piston owing to the collar at its end. During the next downward movement, the piston is in turn not entrained downward.

The passthrough in the piston for the collared piston rod is preferably provided with at least one sealing ring which comes to rest against the collar piston rod in a seal-forming fashion. This sealing measure prevents the pressure medium which is present in the pressure chamber from getting into the ventilated space of the traction cylinder, lying opposite the piston, and then possibly into the environment.

According to another embodiment, the means for mechanical decoupling comprise a pot-shaped piston unit which forms the piston with the piston rod and which penetrates the cylinder casing in a sealed fashion. The piston unit has at the bottom a passthrough for a collared piston rod so that, similarly to the embodiment described above, the piston unit remains in the current position during the downward movement of the collar piston rod. In this embodiment, the piston and piston rod are securely connected to one another and can be embodied, for example, in one piece. The passthrough for leading through the collared piston rod forms a collar on the piston unit. This collar interacts with a corresponding collar at the distal end of the collared piston rod as a stop. The advantage of this embodiment is that the mechanical decoupling does not occur here within the oil-conducting pressure chamber, which prevents corresponding risks of leakage. This embodiment requires only two dynamic seals, specifically a seal between the piston and cylinder casing of the traction cylinder and another seal between the cylinder casing and the collar piston rod in the region of the passthrough.

According to a further embodiment it is proposed that the means for mechanical decoupling be embodied as a penetration bearing. Such a penetration bearing can be arranged either on the car body side or on the bogie side. Specifically, the penetration bearing can be constructed in such a way that the distal end of the piston rod ends in a ball bearing region which interacts with a corresponding bearing seat which is formed in a passthrough in the car body or the bogie for the piston rod. As a result of the downward movement of the piston rod into the region of the car body or of the bogie which is brought about in this solution, the piston, which is rigidly coupled to the piston rod, nevertheless remains in the current position and does not generate a partial vacuum in the pressure chamber. Since the mechanical decoupling is arranged outside the traction cylinder in this embodiment, a conventional traction cylinder advantageously only has to be slightly modified in order to implement the solution.

According to an alternative embodiment, the means for mechanical decoupling have a further collared piston rod which extends through a cylinder-base-end passthrough in the traction cylinder in a ventilated interior space in said traction cylinder. Specifically, this is on the side of the traction cylinder lying opposite the pressure chamber so that the piston rod together with the piston remains in the current position during the downward movement of the car body. In this embodiment too, the piston and piston rod are securely connected to one another, but the bottom of the cylinder casing is open. The passthrough which represents the opening is configured so that a circumferential collar is produced. The further collared piston rod which interacts therewith constitutes, on the one hand, the mechanical decoupling, and on the other hand the traction cylinder is connected to the bogie by this means. Of course, kinematic reversal is also possible in this embodiment.

The piston rod diameter, extends through the passthrough, of the collared piston rod is preferably more than half as large as the collar diameter of the collar piston rod. Such dimensioning results in an extremely strong collar piston rod, which is able to withstand in an optimum way the loads which occur during use.

According to a last embodiment, the means for mechanical decoupling comprise a cylinder head piston which bounds the pressure chamber of the traction cylinder at the end and can be moved axially as far as a cylinder collar, while being sealed in relation to the cylinder casing. The cylinder head piston is also provided with a central passthrough for leading through the piston rod of the piston unit so that the piston unit remains in the current position during the downward movement. In this technical solution, the cylinder head piston is not a fixed component of the cylinder casing of the traction cylinder but rather is decoupled from it in terms of movement and is limited in its travel by a collar at the upper end of the cylinder casing. The cylinder head piston which can be moved axially in relation to the cylinder casing ensures that, when the piston unit moves downward into the cylinder casing, in the pressure chamber no partial vacuum is produced as a result of flow resistance. This is because atmospheric pressure is applied to the outside of the cylinder head piston so that atmospheric pressure always prevails in the pressure chamber due to axial further slipping of the cylinder head piston.

The cylinder head piston may have at least one externally radial sealing ring for providing a seal with respect to the cylinder casing. The passthrough of the cylinder head piston should also be equipped with at least one sealing ring in order also to counteract the risk of hydraulic oil escaping at this location.

Further improvements are illustrated in more detail below together with the description of preferred embodiments of the invention.

DETAILED DESCRIPTION OF THE DRAWINGS

Figure 1:
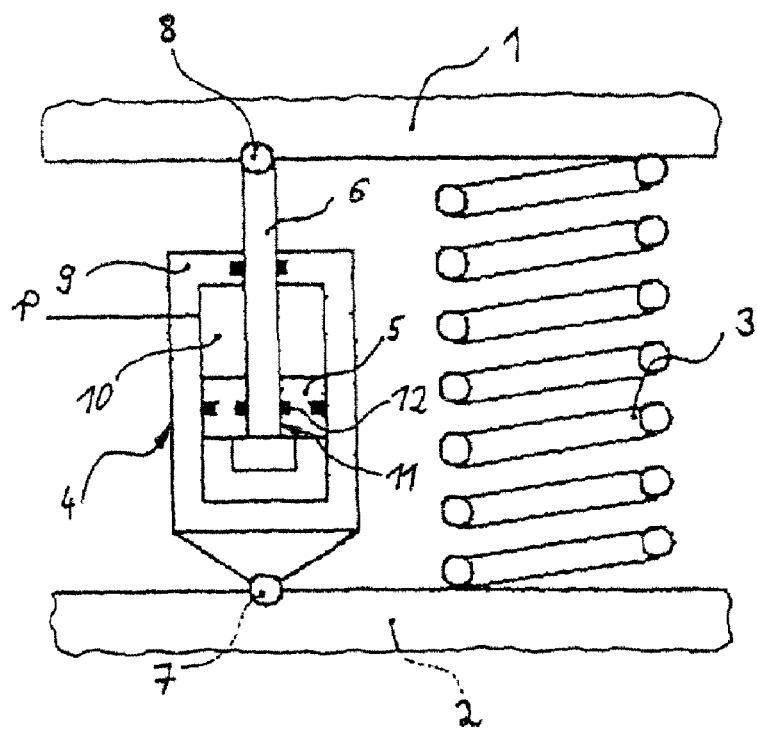
FIG. 1 is a schematic illustration of a first embodiment of means for mechanical decoupling in a traction cylinder.

According to FIG. 1, a spring element 3, for example a steel spring, is arranged between an upper car body 1 (of a rail vehicle which is not illustrated in more detail) and a lower bogie 2. The spring element 3 ensures, while the rail vehicle is traveling, that there is a raised travel level for the car body 1 so that the latter remains very largely unaffected by troublesome vibrations due to the travel. The spring element 3 at the same time also provides transverse suspension of the car body 1. A traction cylinder 4 is arranged parallel to the spring element 3. The traction cylinder 4 to this extent also acts between the upper car body 1 and the lower bogie 2 and is coupled hereto via a lower pivot bearing 7 or upper pivot bearing 8.

The traction cylinder 4 is composed essentially of a cylinder casing 9 in which a piston 5 is accommodated in an axially moveable fashion. Hydraulic oil is applied to the piston 5 via a pressure supply line p, which is connected to a pressure chamber 10 in the cylinder casing 9. On the side of the piston 5 lying opposite the pressure chamber 10, the piston is relieved of loading. A piston rod 6 whose distal end ends at the upper pivot bearing 8 is connected to the piston 5.

The traction cylinder 4 serves to compress the adjacent spring element 3 so that the car body 1 can be transferred from its normally raised travel level into a lowered railway platform level. At this lower railway platform level, the door thresholds (not illustrated in more detail) of the entry doors of the car body 1 correspond to the height of the railway platform (also not illustrated) so that unimpeded entry and exit is possible.

The traction cylinder 4 is also equipped with means for mechanically decoupling the downward movement of the car body 1 from a reduction in pressure in the pressure chamber 10 of the traction cylinder 4. In this embodiment, the piston 5 is for this purpose provided with a central passthrough 11 through which the collared piston rod 6 extends. A downward movement of the collared piston rod 6 has the effect, due to the mechanical decoupling, that the piston 5 remains in the current position and no partial vacuum is produced in the pressure chamber 10. In order to provide a seal, the passthrough 11 in the piston 5 is provided with a sealing ring 12, which rest in a seal-forming fashion against the collar piston rod 6.

Figure 2:
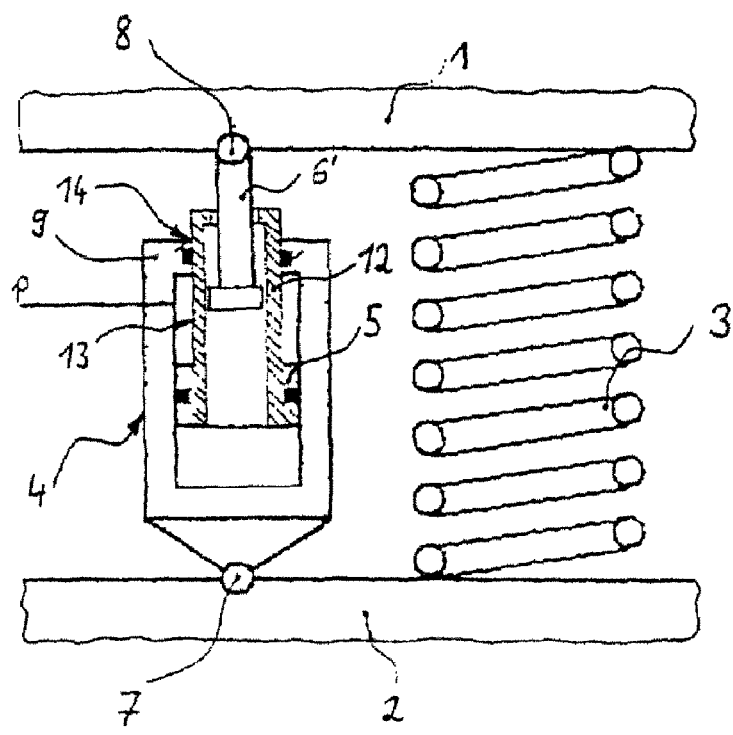
FIG. 2 is a schematic illustration of a second embodiment of means for mechanical decoupling in a traction cylinder.

According to FIG. 2, the means for mechanical decoupling comprise a pot-shaped piston unit 13 which forms the piston 5 with piston rod 12 and which penetrates the cylinder casing 9 in a sealed fashion. The piston unit 13 has at the bottom a passthrough 14 through which a collared piston rod 6' extends. As a result of this, the piston unit 13 and thus also the piston 5 remain in the current position during a downward movement of the collared piston rod 6'.

Figure 3:
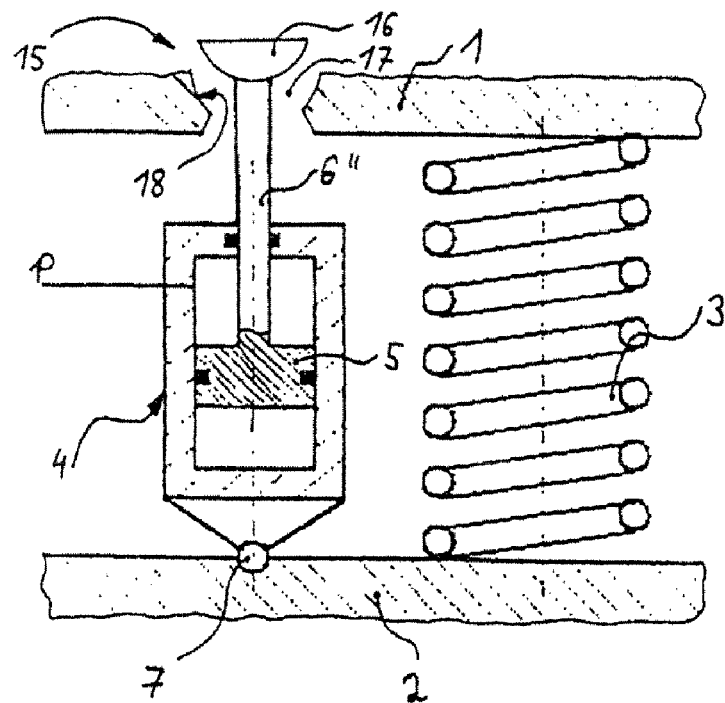
FIG. 3 is a schematic illustration of a third embodiment of means for mechanical decoupling in a traction cylinder.

According to FIG. 3, a core component of another embodiment of the means for mechanical decoupling is a penetration bearing 15, which is provided here at the car body 1 end. The distal end of the piston rod 6" ends in a ball bearing region 16 which interacts with a corresponding bearing seat 18 which is formed in a passthrough 17 in the wall of the car body 1 for the piston rod 6". Here too, the piston rod 6" together with the piston 5 remain in the current position during a downward movement of the car body 1. In contrast, the end of the piston rod 6" which is equipped with the ball bearing region 16 moves upwardly into the interior of the car body 1. The mechanical decoupling therefore takes place outside the traction cylinder 4.

Figure 4:
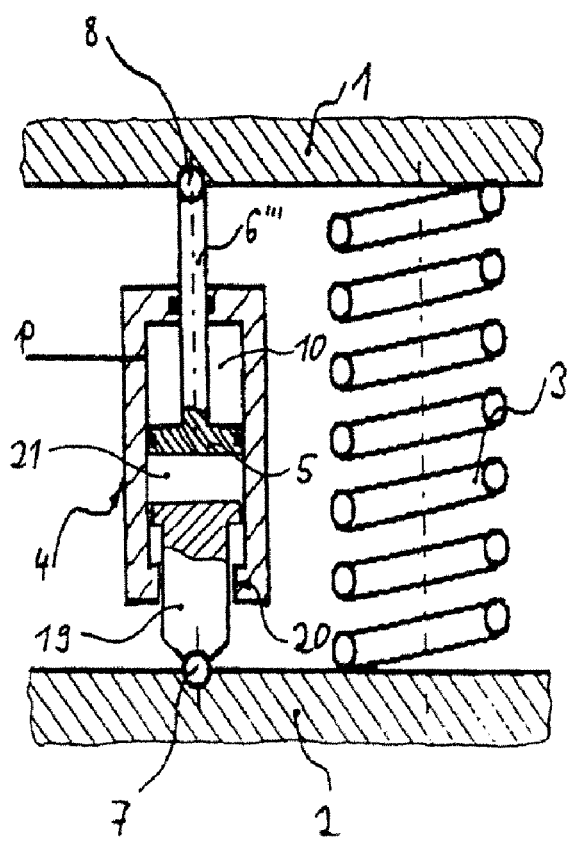
FIG. 4 is a schematic illustration of a fourth embodiment of means for mechanical decoupling in a traction cylinder.

According to FIG. 4, in this traction cylinder 4 the means for mechanical decoupling are arranged at the cylinder base end. The means comprise a collared piston rod 19 which projects through a cylinder-base-end passthrough 20 into a ventilated interior space 21 which bounds the piston 5 with respect to the pressure chamber 10. The stable collared piston rod 19 has a diameter which corresponds to the diameter of the interior space 21 minus the width of the collar. A downward movement of the car body 1 also leads here to the piston rod 6''' together with the piston 5, which bounds the pressure chamber 10, remaining in the current position. This is because the coaxial collared piston rod 19 carries out an unimpeded insertion movement into the cylinder casing 9 in reaction to the aforesaid loading.

Figure 5:
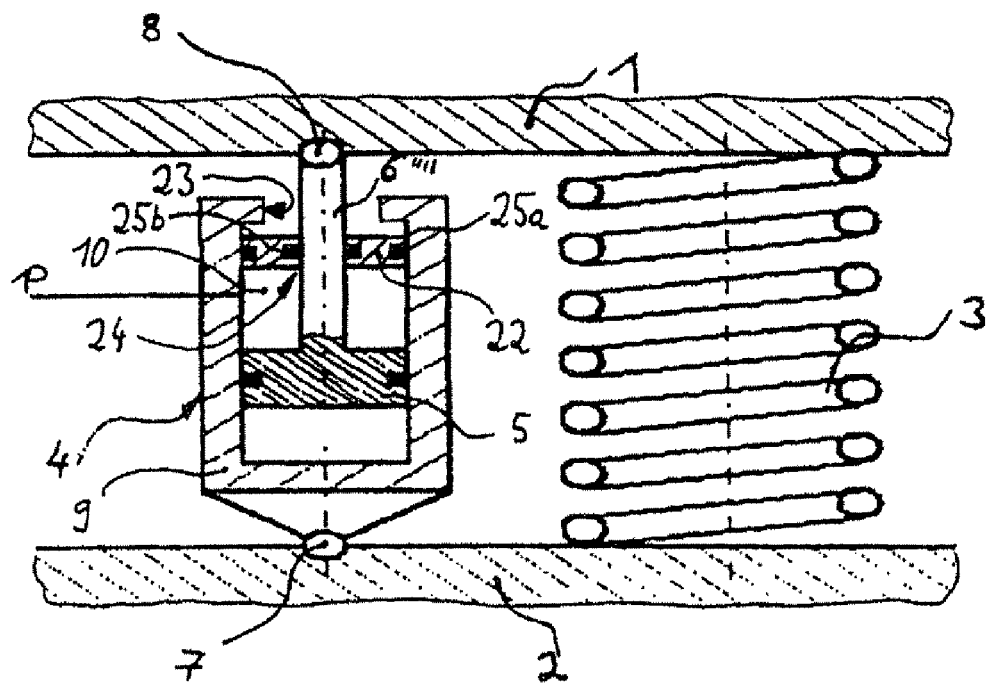
FIG. 5 is a schematic illustration of a fifth embodiment of means for mechanical decoupling in a traction cylinder.

According to FIG. 5, a cylinder head piston 22 is a main component of the means for mechanical decoupling in this traction cylinder 4. The cylinder head piston bounds the pressure chamber 10 at the end. The cylinder casing 9 has at the cylinder head end an inwardly directed cylinder collar 23 which serves as an upper stop for the cylinder piston 22. The cylinder head piston 22 is provided with a central passthrough 24 through which the piston rod 6"", which forms a unit with the piston 5 here, moves in a sealed fashion. For sealing purposes, the specific cylinder head piston 22 is provided with an externally radial seal 25a as well as an internally radial sealing ring 25b which is arranged in the passthrough 24. The cylinder head piston 22 is therefore not a fixed component of the cylinder casing 9 here but rather can be moved axially with respect thereto. Thus so that during a downward movement of the piston rod 6"", the cylinder head piston 22 is also displaced, as a result of which a partial vacuum in the pressure chamber 10 is avoided.

The invention is not restricted to the preferred embodiments specified above. Instead, further embodiments are also conceivable and they are included in the scope of protection of the following claims.

The invention claimed is:

1. A device for the secondary suspension of a car body in a rail vehicle, having a spring element between the car body and a bogie which ensures at least a raised travel level for the car body while the rail vehicle is traveling,
   wherein the spring element can be compressed by a traction cylinder having a piston when the rail vehicle is stationary, in order to set a lowered railway platform level, below the raised travel level, for the car body,
   wherein the traction cylinder includes means for mechanically decoupling the downward movement of the car body from the piston such that the piston does not move in response to the downward movement,
   wherein the means includes a piston rod in the traction cylinder, and the mechanical decoupling is effected by decoupling of the force in the piston rod from the traction cylinder, and
   wherein the piston rod is a collared piston rod and wherein the means for mechanical decoupling includes a pot-shaped piston unit which forms the piston with a piston rod portion and which penetrates the cylinder casing in a sealed fashion, the piston unit having, at the bottom, a passthrough for the collared piston rod so that the piston unit remains in the current position during the downward movement of the collared piston rod.

\* \* \* \* \*